US005243245A

United States Patent [19]
Oba

[11] Patent Number: 5,243,245
[45] Date of Patent: Sep. 7, 1993

[54] STRUCTURE AND METHOD OF FIXING HOUSING

[75] Inventor: Hiroshi Oba, Shizuoka, Japan

[73] Assignee: Asmo Co., Ltd., Kosai, Japan

[21] Appl. No.: 921,127

[22] Filed: Jul. 29, 1992

[30] Foreign Application Priority Data

Aug. 23, 1991 [JP] Japan ............... 3-066996[U]

[51] Int. Cl.$^5$ ............................................. H02K 5/00
[52] U.S. Cl. ....................................... 310/89; 29/596
[58] Field of Search ................ 310/85, 89, 90, 91; 29/596

[56] References Cited

U.S. PATENT DOCUMENTS 4,319,150  3/1982  Roddy et al. ................ 310/89
4,800,309  1/1989  Lakin ........................... 310/90

FOREIGN PATENT DOCUMENTS 3312904  11/1984  Fed. Rep. of Germany ........ 310/89
1547268  10/1968  France ........................ 310/89
59-132374  9/1984  Japan ......................... 310/89
62-107541  7/1987  Japan ......................... 310/89

Primary Examiner—Steven L. Stephan
Assistant Examiner—Matthew Nguyen
Attorney, Agent, or Firm—Stanley P. Fisher

[57] ABSTRACT

A structure and method of fixing a housing in which four mounting grooves are formed at regular intervals along a peripheral direction at an opening end of a cylindrical yoke housing. An end housing is provided with a peripheral portion whose outer diameter is formed smaller than an inner diameter of the yoke housing, and a plurality of protrusions which protrude from the peripheral portion and correspond to the mounting grooves. In a state in which the protrusions are each mounted to the corresponding mounting grooves, four pairs of caulking claws, each pair of which is disposed at both ends in a widthwise direction of a respective mounting groove, are all fixed by being caulked simultaneously. The end housing is thereby coaxially fixed to the yoke housing.

22 Claims, 10 Drawing Sheets

STRUCTURE AND METHOD OF FIXING HOUSING

BACKGROUND OF THE INVENTION

1. Field of the Invention

The present invention relates to a fixing structure for a housing of a motor for the purpose of coaxially fixing an end housing to a cylindrical yoke housing at one opening end of the cylindrical yoke housing.

2. Description of the Related Art

Some motors have been disclosed in which a yoke housing is formed into a cylindrical shape and has a rotor and a stator located therein. An end housing supporting the rotor is fixed at one opening end of the yoke housing.

That is to say, at the opening end of the cylindrical yoke housing, there is formed a plurality of mounting grooves. At the end housing, there is formed a plurality of disc-shaped protrusions, each of which corresponds to respective ones of the plurality of mounting grooves and protrudes in the radial direction of the end housing. This prior art has been provided in such a manner that the protrusions are each positioned (set) in the respective mounting grooves of the yoke housing at the same time that the end housing is fitted to the opening end of the yoke housing. In this state, the peripheral portions of the mounting grooves are caulked such that the protrusions do not come out of the mounting grooves. The end housing can thereby be fixed to the yoke housing (for an example, see Japanese Utility Model Application Laid-Open No. 62-107541).

Incidentally, in such a conventional fixing structure for a housing, the end housing, whose periphery is entirely or partly formed into a round shape, is coaxially fixed, that is, centered (or aligned centrally), to the yoke housing by being fitted into the opening end of the yoke housing.

In this case, in order to accurately effect such centering and coaxial fixing of the end housing to the yoke housing, high accuracy of the dimension of the inner diameter of the yoke housing, the dimension of the outer diameter of the end housing, and the circularities of these housings is inevitably required.

However, it is very difficult to form both the yoke housing and the end housing with high accuracy. It is particularly difficult to form the circularity of the cylindrical yoke housing with high accuracy. Therefore, it is difficult to center the end housing accurately and fix it coaxially to the yoke housing. A solution of such a problem has been desired.

Under these circumstances, a solution in which the yoke housing and the end housing are both merely finished with precision results in a substantial increase in cost.

SUMMARY OF THE INVENTION

In view of the aforementioned facts, it is an object of the present invention to provide a fixing structure and a fixing method in which an end housing can be accurately fixed coaxially to a yoke housing by means of a simple mechanism and at a low cost.

According to the present invention, there is provided a fixing structure for a yoke housing and an end housing, in which said end housing supporting one end of a rotor is positioned at an opening portion of the yoke housing, which is substantially cylindrical and has a bottom and in which the rotor and a stator are accommodated. The yoke housing is then caulked so that the yoke housing and the end housing can be fixed to each other. This fixing structure includes at least three extending portions provided at the end housing so as to be disposed at regular intervals along the peripheral direction of the yoke housing, at least three joining portions provided at the yoke housing, and corresponding in number and position to the extending portions. The joining portions are all simultaneously caulked after the extending portions are each located in respective ones of the joining portions, so that the yoke housing and the end housing are coaxially positioned with each other.

According to the present invention with the aforementioned construction, since the joining portions, which are disposed at regular intervals along the circumferential direction at the opening portion of the yoke housing, are all simultaneously caulked when this caulking is effected, the end housing is moved to a position coaxial with the yoke housing and fixed thereat, thereby allowing an automatic centering of the end housing. Further, in the present invention, a clearance may be provided in an area where the yoke housing and the end housing are located. Accordingly, this does not prevent a centering movement of the end housing and does not require high accuracy of the dimension of the yoke housing inner diameter and the dimension of the end housing outer diameter and of the circularities of these housings, which in turn results in easier manufacturing and lower cost.

Further, according to the present invention, there is provided a method of fixing a yoke housing and an end housing, in which the end housing supporting one end of a rotor is positioned at an opening portion of the yoke housing, which is substantially cylindrical and has a bottom and in which the rotor and a stator are accommodated. The yoke housing is then caulked so that the yoke housing and the end housing can be fixed to each other. This fixing method includes the following steps: a first step of providing at least three extending portions at the end housing such that the extending portions are disposed at regular intervals along the peripheral direction of the yoke housing; a second step of providing at least three joining portions at the yoke housing such that the joining portions correspond in number and position to the extending portions; a third step of positioning each of the extending portions at the respective joining portion; and a fourth step of simultaneously caulking all of the joining portions after the third step, and fixing the end housing and the yoke housing to each other such that the yoke housing and the end housing are positioned coaxially with each other.

According to the present invention with the aforementioned method, since the joining portions are all simultaneously caulked, the extending portions are positioned and fixed during this caulking such that the end housing and the yoke housing are positioned coaxially with each other, thereby allowing an automatic centering of the end housing.

DESCRIPTION OF THE PREFERRED EMBODIMENTS

Referring now to FIGS. 1 through 4, there is shown a motor 10 to which the present invention is applied. Further, in FIGS. 5 through 8, the component parts of the motor 10 are each shown.

Figure 6:
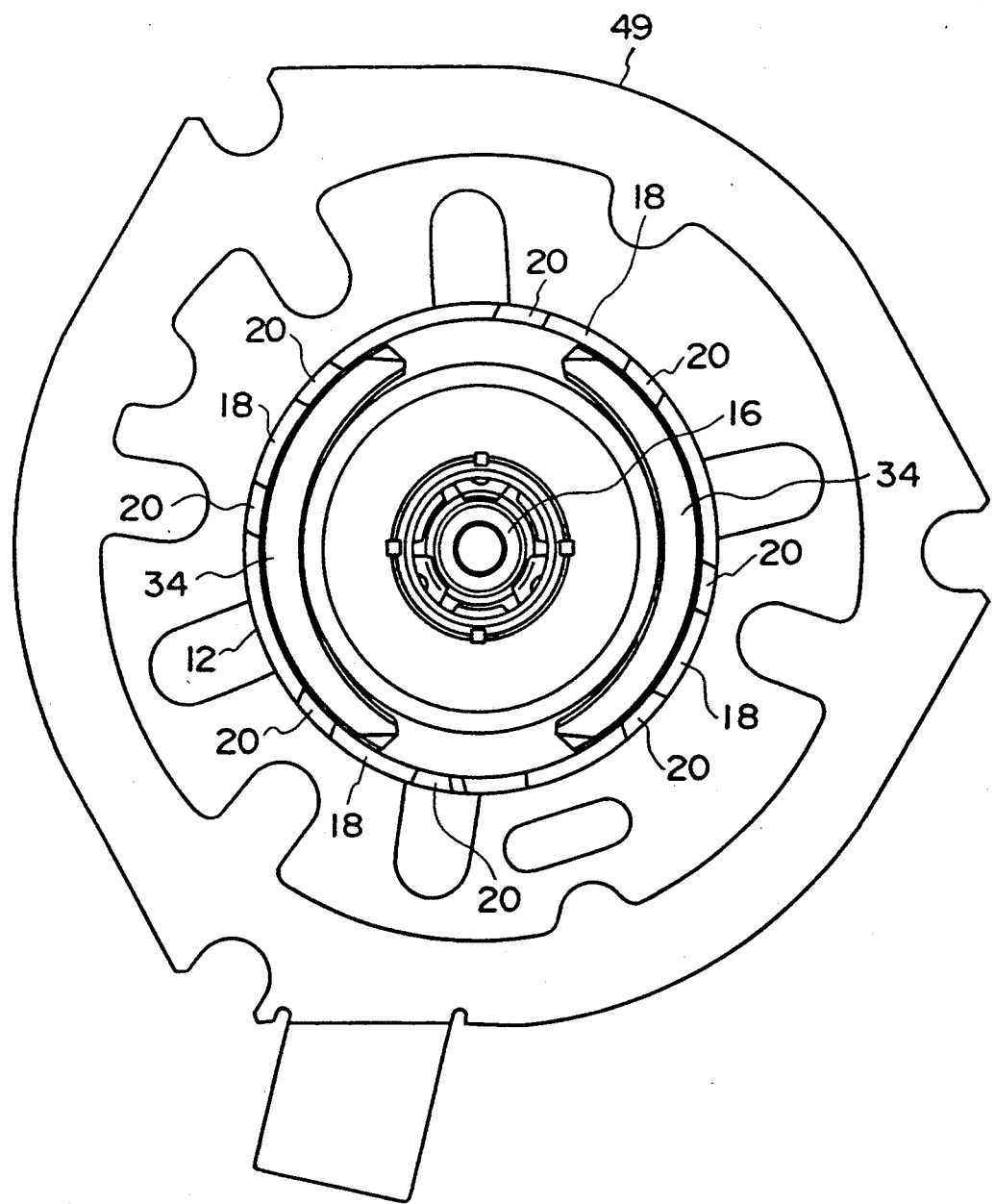
FIG. 6 is a front view of the yoke housing of the motor.

A yoke housing 12 of the motor 10 is formed into a cylindrical shape with one bottom. One end of the yoke housing 12 in the axial direction thereof is processed by drawing. Further, a bearing 16 is provided at this bottom wall 14. At the other end of the yoke housing 12, as illustrated in FIG. 6 in particular, four mounting grooves 18 are circumferentially formed four at regular intervals. A plurality of claw forming portions 20 are formed at both sides of each mounting groove 18. An end housing 22 is fixed at this end of the yoke housing 12 by applying a fixing structure, which will be described hereinafter in more detail, to the yoke housing.

Figure 1:
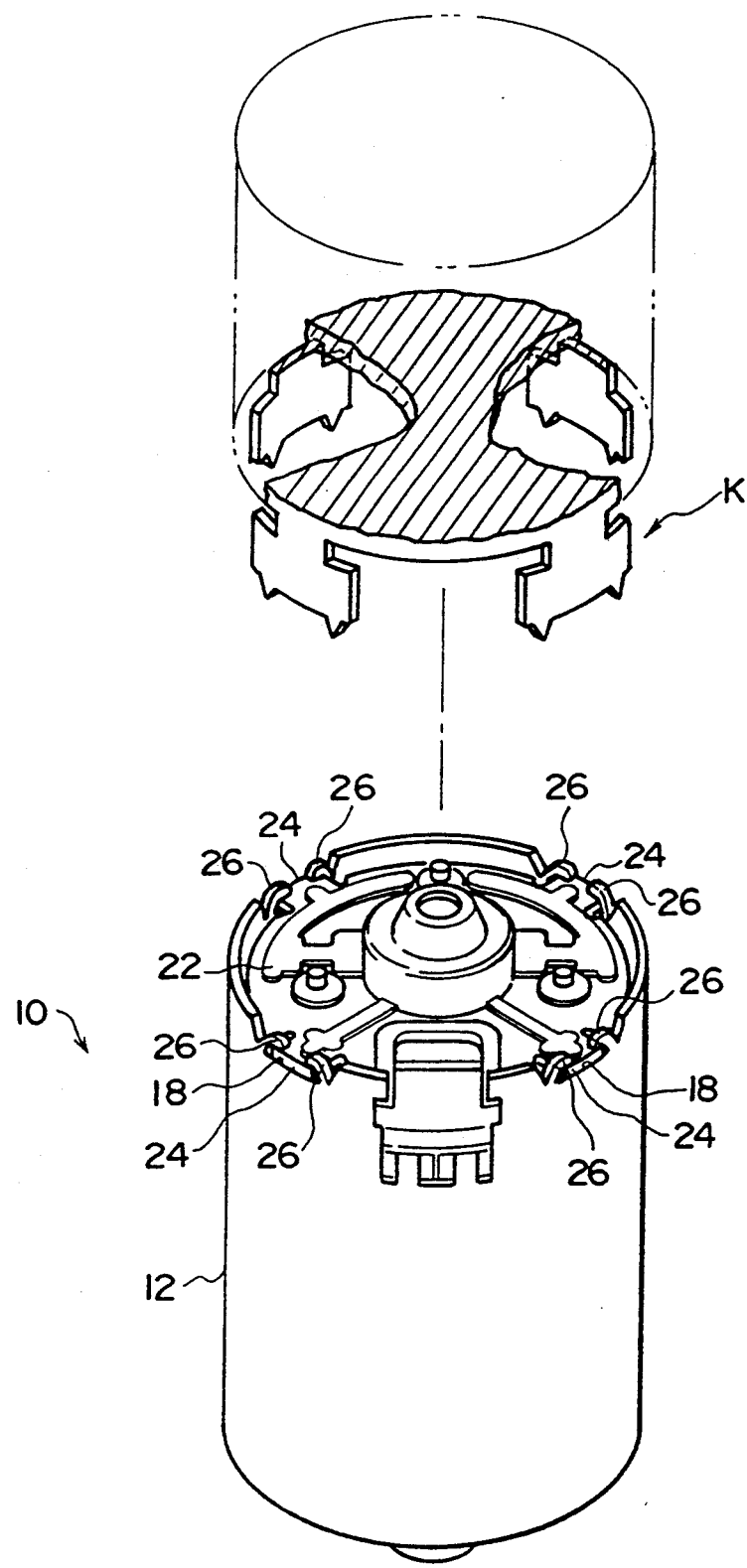
FIG. 1 is an overall perspective view of a motor to which a fixing structure for a housing according to the present invention is applied.
Figure 3:
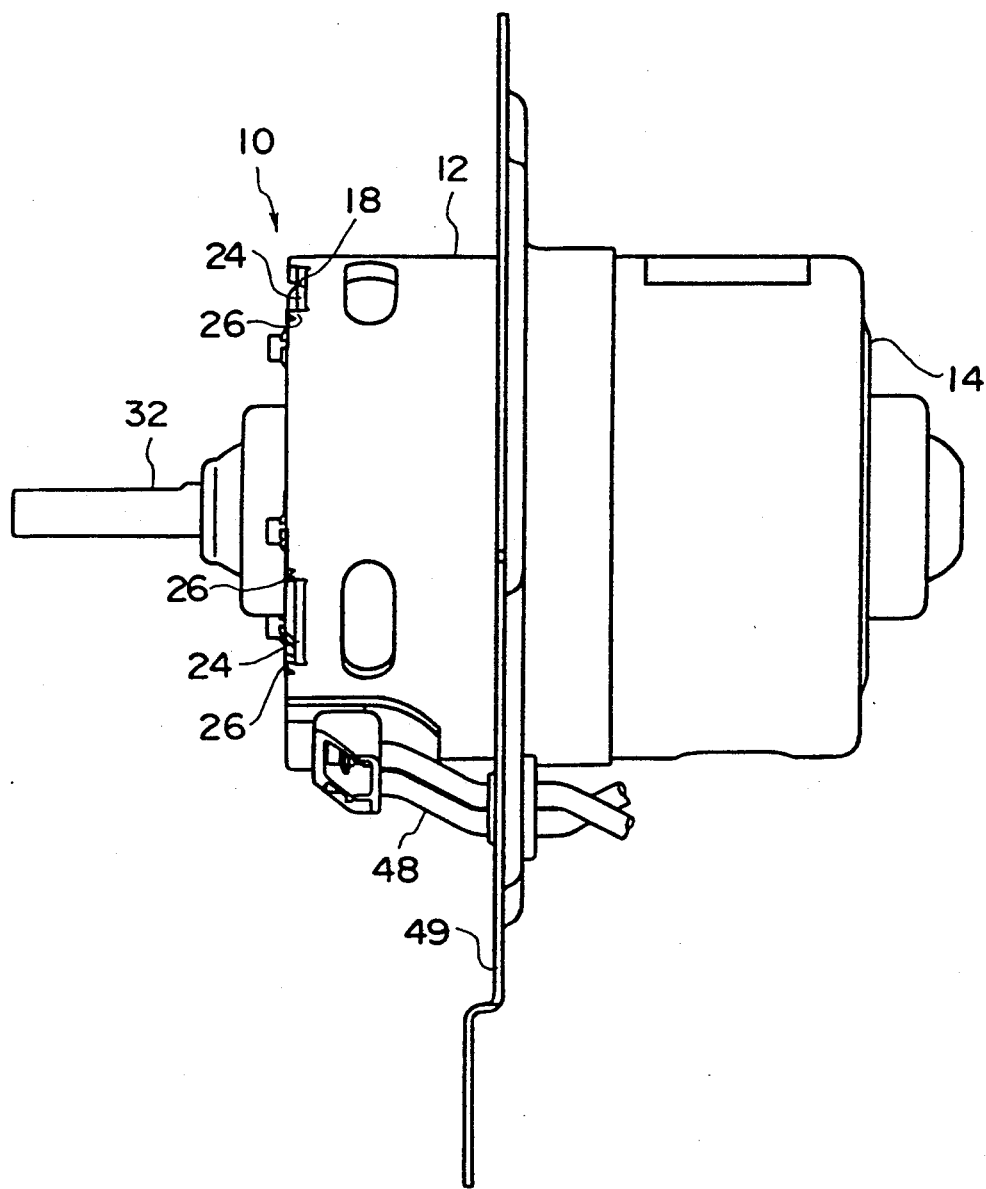
FIG. 3 is an overall side view of the motor.
Figure 4:
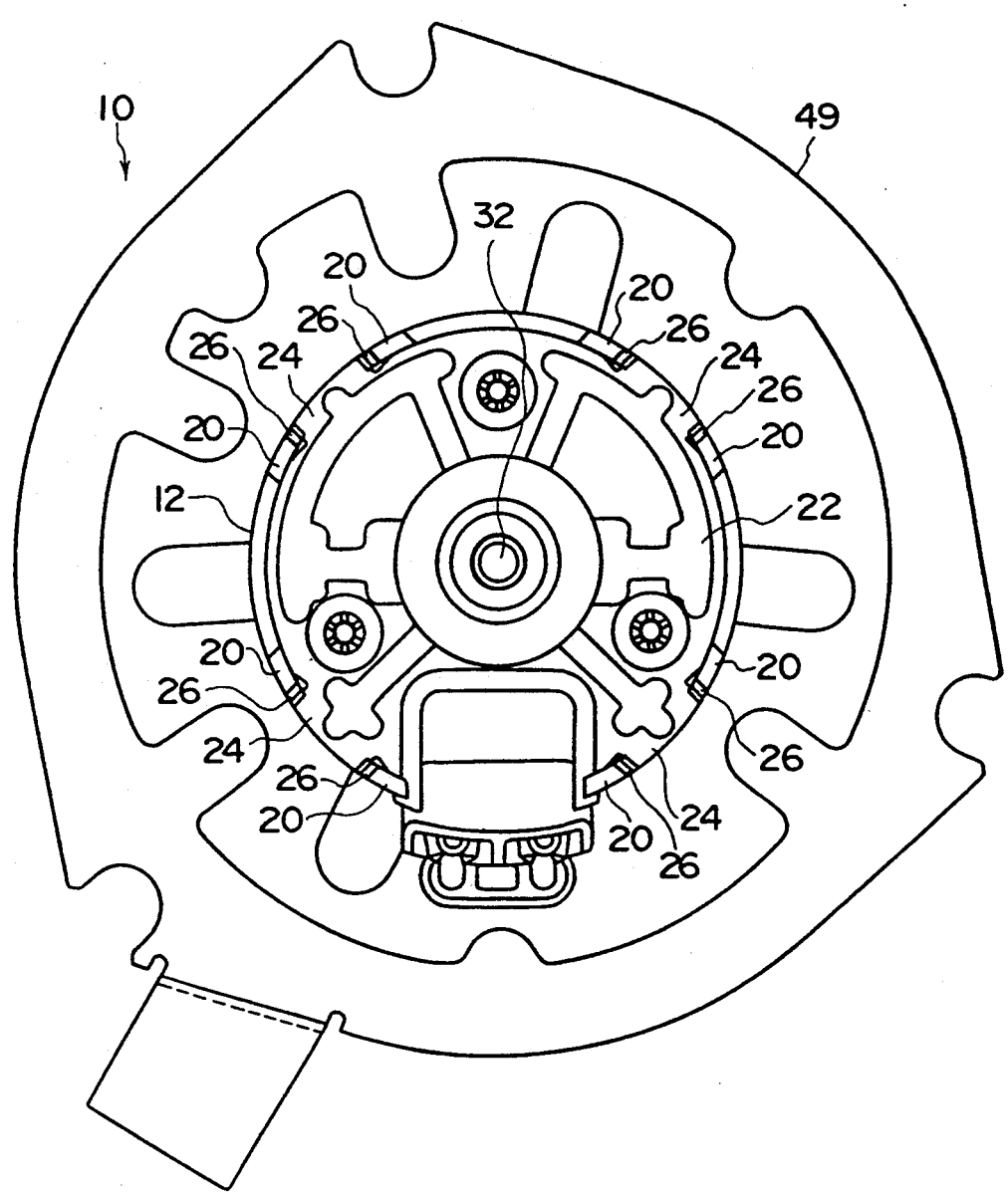
FIG. 4 is an overall front view of the motor.
Figure 5:
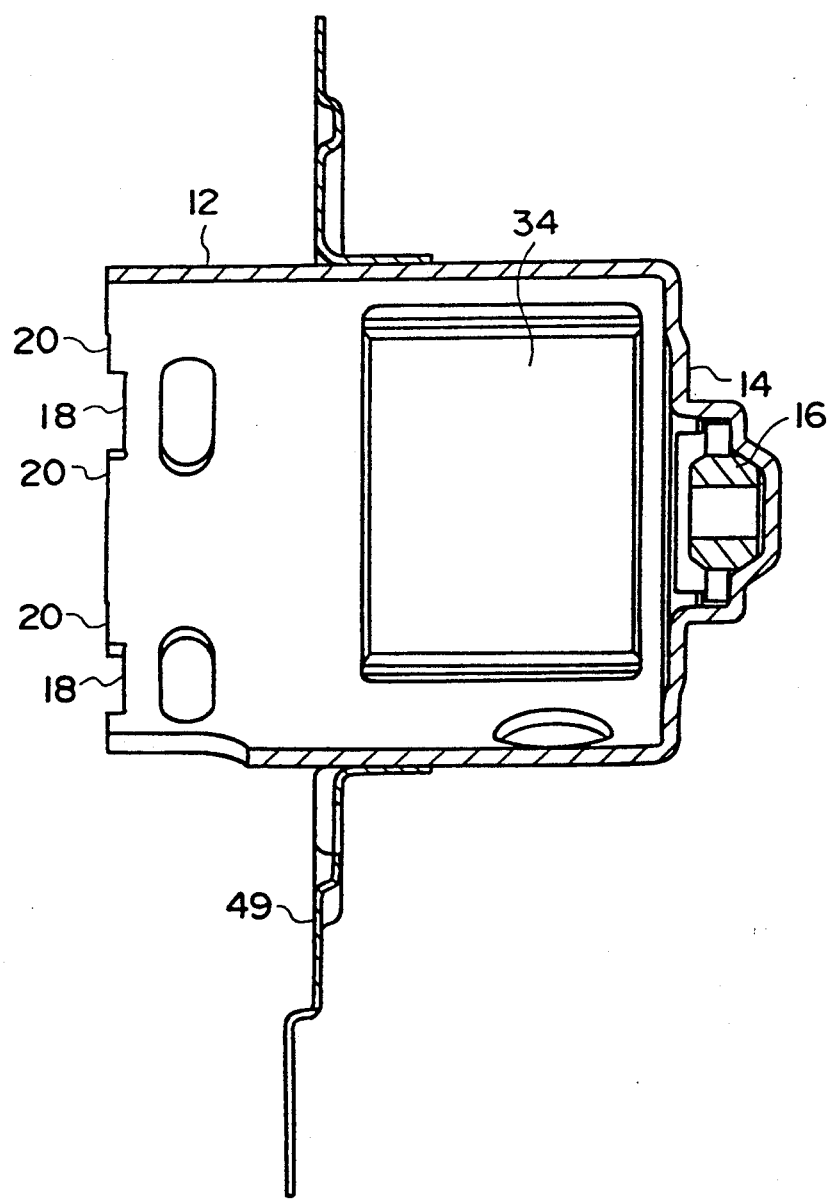
FIG. 5 is a cross-sectional view of a yoke housing of the motor.
Figure 7:
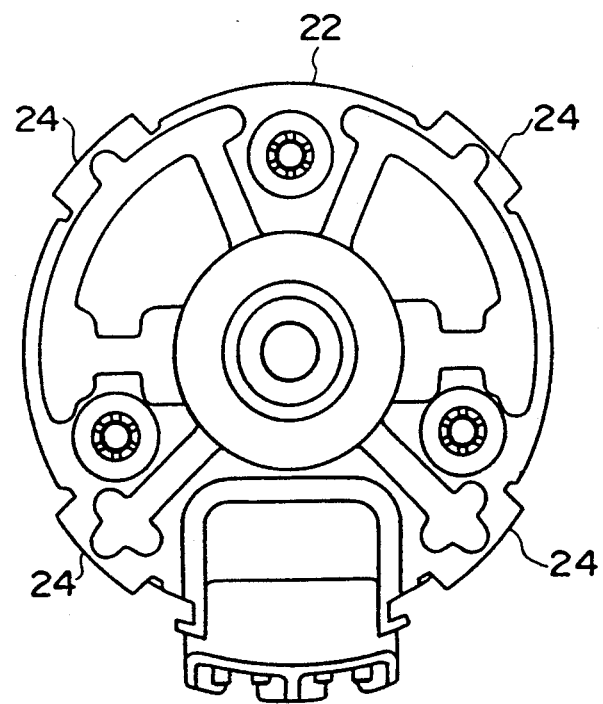
FIG. 7 is a front view of an end housing of the motor.
Figure 8:
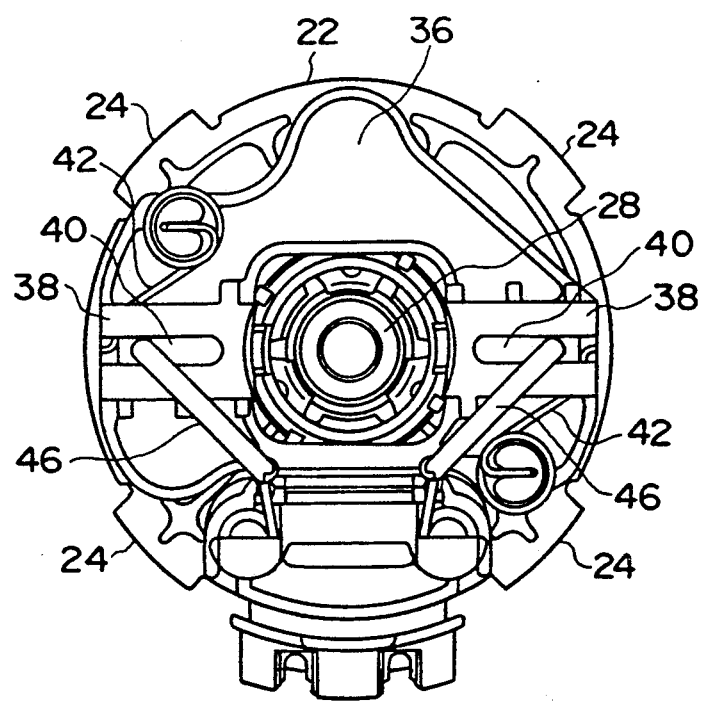
FIG. 8 is a back view of the end housing.

The end housing 22 is formed into a disc shape by press molding a thin-walled plate material, whose outer diameter is slightly smaller than the inner diameter of the yoke housing 12. There are formed at the periphery of the end housing 22, as illustrated in FIGS. 7 and 8 in particular, four protrusions 24, each of which corresponds to the respective mounting grooves 18 of the yoke housing 12 and each of which protrudes in the radial direction of the end housing 22. When the end housing 22 is inserted into the opening end of the yoke housing 12, these protrusions 24 are each positioned (set) in the respective mounting grooves 18 of the yoke housing 12. Since, in this state, the claw forming portions 20 (peripheral portions of the mounting grooves 18) are caulked by a caulking device K (see FIG. 1), and a plurality of caulking claws 26 are formed as illustrated in FIGS. 1, 3 and 4, the protrusions 24 are each unable to come out from the respective mounting grooves 18, thereby resulting in the structure for fixing the end housing 22 to the yoke housing 12.

A bearing 28 is located in the center portion of the end housing 22. The bearing 28 and the bearing 16 of the yoke housing 12 support a shaft 32 of a rotor 30 contained within the yoke housing 12. A magnet 34 is fixed to the inner wall of the yoke housing 12 which opposes the rotor 30.

An insulator plate 36 is positioned between the rotor 30 and the bearing 28. The insulator plate 36 is made of a thin-walled synthetic resin and is positioned in a lateral direction of the bearing 28 so as to be fixed to the end housing 22.

As illustrated in FIG. 8, a brush holder 38 is fixed to the insulator plate 36. A brush 40 is held together with a spring 42 by the brush holder 38. The spring 42 is used to always holder 38, thereby causing the brush 40 to be the brush holder 38, thereby causing the brush 40 to be forced against a commutator 44 of the rotor 30 shown in FIG. 2. Also, a connecting pig-tail 46 is pulled out from the brush 40 and is connected to a connecting line 48.

Figure 2:
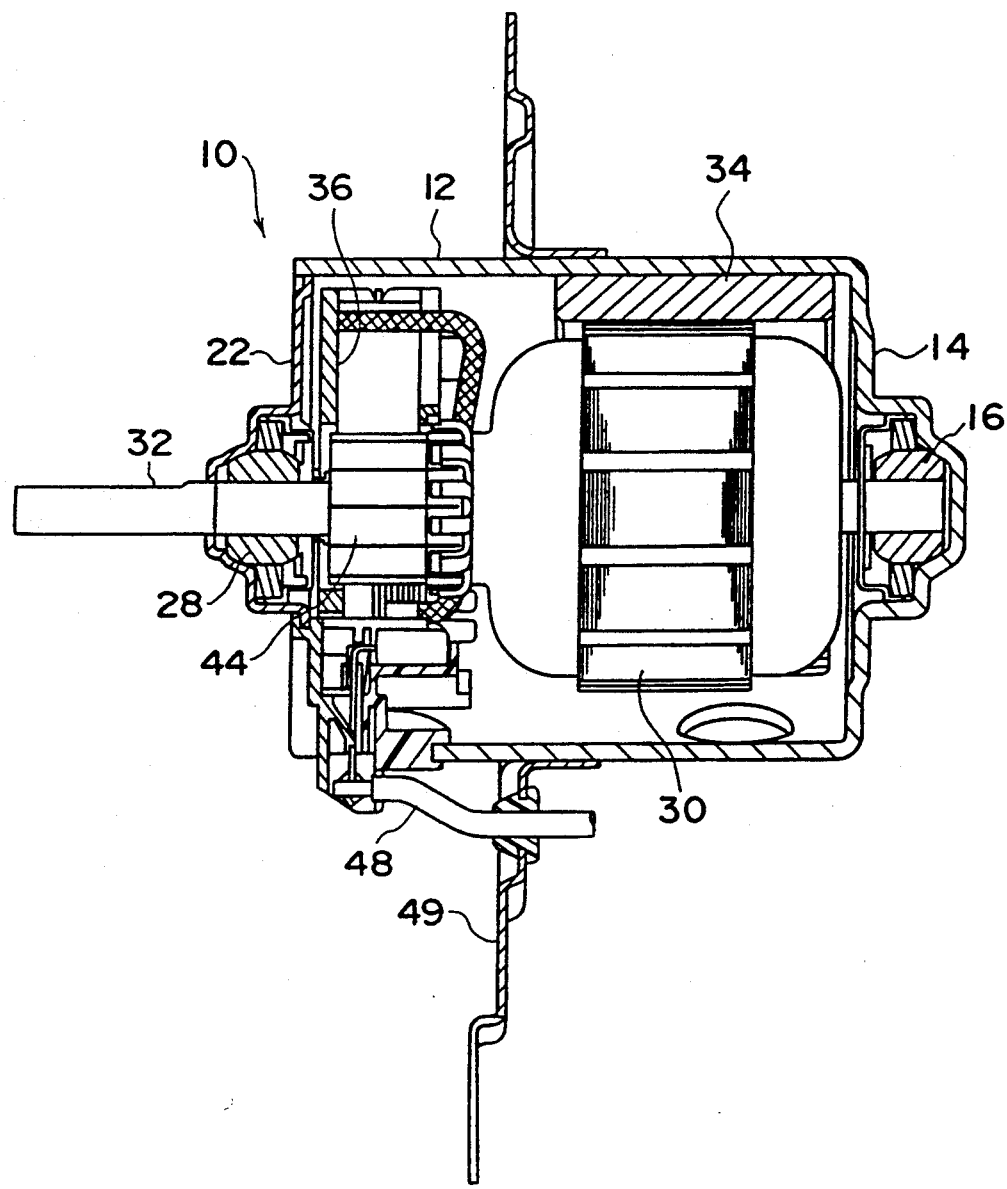
FIG. 2 is an overall cross-sectional view of the motor.

As illustrated in FIG. 2, a bracket 49 is attached to the outer periphery of the yoke housing 12 and is used to fix the motor 10 in a predetermined position.

Next, the operation of the present invention will be described hereinafter together with a procedure for fixing the end housing 22 to the yoke housing 12.

In the motor 10 with the aforementioned construction, when the end housing 22 is fixed to the yoke housing 12, the end housing 22 is first inserted into the opening end of the yoke housing 12, and at the same time, the protrusions 24 are each positioned (set) in the respective mounting grooves 18 of the yoke housing 12.

Figure 9:
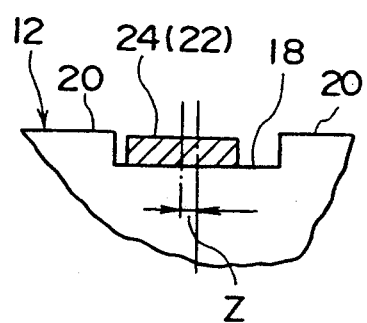
FIG. 9 is a schematic side view showing the state in which the end housing is set to the yoke housing.
Figure 10:
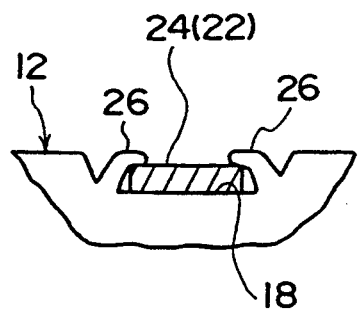
FIG. 10 is a schematic side view showing the state in which the end housing is fixed to the yoke housing by means of caulking.

At this point in time, the outer diameter of the end housing 22 is formed slightly smaller than the inner diameter of the yoke housing 12 so as to create a clearance therebetween (in other words, both housings are formed without extremely high accuracy). Each protrusion 24 of the end housing 22 is positioned in the respective mounting groove 18 so as to be off from its normal position by a certain displacement Z, as illustrated in FIG. 9.

Next, in this state, four claw forming portions 20 (that is, the peripheral portions of the mounting grooves 18) are all simultaneously caulked by the caulking device K as illustrated in FIG. 1 (that is, a plurality of caulking claws 26 are all formed simultaneously), and the protrusions 24 are each unable to come out from the respective mounting grooves 18 so that the end housing 22 is fixed to the yoke housing 12. In this case, since the four caulking portions (that is, portions for forming the caulking claws 26) are all simultaneously caulked, the end housing 22 is moved to a position coaxial with the yoke housing 12 and is fixed thereat during this caulking. Automatic centering (that is, aligning) of the end housing 22 is thereby effected.

In this case, since a clearance if formed in an insertion area of the yoke housing 12 and the end housing 22, there is no possibility of preventing the centering movement of the end housing 22. Further, this construction does not require high accuracy of the dimension of the yoke housing inner diameter, the dimension of the end housing outer diameter, and the circularities of these housings, thereby resulting in easier manufacturing and lower cost.

In this manner, a clearance in an insertion area of the yoke housing 12 and the end housing 22 is provided, and four caulking portions disposed circumferentially at regular intervals are all simultaneously caulked by the caulking device K so that the end housing 22 is fixed to the yoke housing 12. The end housing 22 is thereby accurately fixed coaxially to the yoke housing 12 by means of a simple mechanism and at a low cost.

Figure 11:
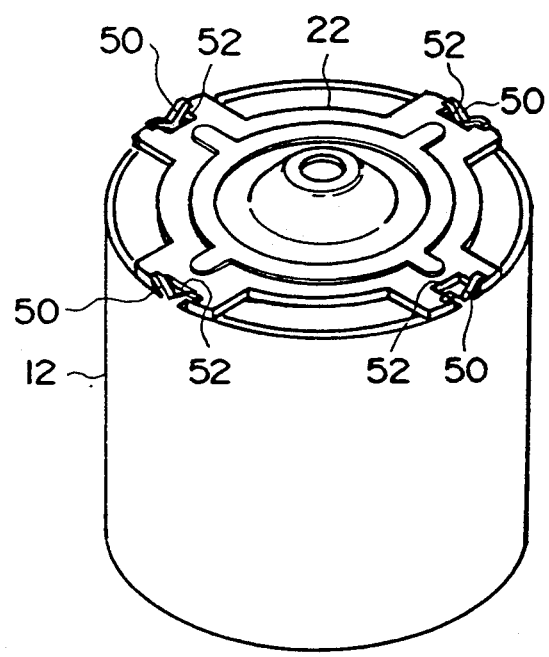
FIG. 11 is a perspective view showing an alternative embodiment of fixing portions of the end housing and the yoke housing.

Incidentally, the embodiment of the present invention has been described and illustrated with a construction in which the plurality of mounting grooves 18, which is formed in the yoke housing 12, and the plurality of protrusions 24, which is formed in the end housing 22 and each of which connected with each other. However, the present invention is not limited to the same, and may be applied to a modified construction in which a plurality of mounting grooves 52, which are formed in the end housing 22, and a plurality of protrusions (that is, caulking claws) 50 are connected with each other, as illustrated in FIG. 11. Even in this case, since these four caulking portions are all caulked simultaneously, the end housing 22 is moved to a position coaxial with the yoke housing 12 and fixed thereat, thereby allowing an automatic centering of the end housing 22.

Further, in the aforementioned embodiment, a construction in which the caulking portions (that is, portions for forming the mounting grooves 18) are respectively disposed in four places has been described. However, the present invention is not limited to the same, and can be applied to modifications in which three or five caulking portions are disposed circumferentially at regular intervals at the opening of the yoke housing 12. Even in this case, since these caulking portions are all caulked simultaneously by the caulking device K, the end housing 22 is moved to a position coaxial with the yoke housing 12, thereby allowing an automatic centering of the end housing The present invention with the aforementioned construction has an excellent advantage in that the end housing can be accurately fixed coaxially to the yoke housing by means of a simple mechanism and at a low cost.

What is claimed is:

1. A fixing structure for a yoke housing and an end housing, in which said end housing supporting one end of a rotor is positioned at an opening portion of said yoke housing said yoke housing being substantially cylindrical and having a bottom in which said rotor and a stator are accommodated, and wherein said yoke housing and said end housing are fixed together by a caulking of said yoke housing, comprising:

at least three extending portions provided at said end housing so as to be disposed at regular intervals along a peripheral direction of said yoke housing; and at least three joining portions provided at said yoke housing and corresponding in number and position to said at least three extending portions, said at least three joining portions respectively holding said at least three extending portions such that said at least three extending portions are movable in a direction orthogonal to an axis of said yoke housing, said at least three joining portions all being caulked at the same time after said at least three extending portions are each located in the respective one of said at least three joining portions, thereby allowing said end housing and said yoke housing to be fixed to each other such that said yoke housing and said end housing are positioned coaxial with each other.

2. A fixing structure for a yoke housing and an end housing according to claim 1, wherein each of said joining portions is disposed at said opening portion of said yoke housing and is a groove section capable of respectively containing each of said extending portions.

3. A fixing structure for a yoke housing and an end housing according to claim 2, wherein said end housing has a peripheral portion whose outer diameter is small than an inner diameter of said opening portion of said yoke housing, and a first clearance is formed between an inner diameter of said yoke housing and the outer diameter of said end housing when said end housing is positioned in said opening portion of said yoke housing.

4. A fixing structure for a yoke housing and an end housing according to claim 3, wherein a pair of caulking claws are provided at both ends in a widthwise direction of said groove section, said pair of caulking claws all being inclined inwardly from outside in the widthwise directions of each of said extending portions and caulked so that said end housing and said yoke housing are fixed such that said yoke housing and said end housing are coaxially positioned with each other.

5. A fixing structure of a yoke housing and an end housing according to claim 3, wherein a width of said groove section is formed wider than a width of said extending portion, and a second clearance is formed circumferentially in said opening portion of said yoke housing when said extending portion is inserted into said groove section.

6. A fixing structure for a yoke housing and an end housing according to claim 3, wherein each of said extending portions is disposed such that an extending direction thereof is orthogonal to a notched direction of said respective groove section.

7. A fixing structure for a yoke housing and an end housing according to claim 1, wherein said extending portion is provided with a notched portion which is notched from an end portion of said end housing in a radical direction toward an axis and in which a respective one of said joining portions is inserted.

8. A fixing structure for a yoke housing and an end housing according to claim 7, wherein said joining portions are each disposed along a circumferential direction of said opening portion of said yoke housing and each includes a pair of projecting portions projecting in an axial direction of said yoke housing from a peripheral portion of said opening portion, and after each of said pairs of projecting portions are inserted into respective ones of said notched portions, said pairs of projecting portions are inclined outwardly in their widthwise directions so as to be caulked, thereby allowing said extending portions to be fixed.

9. A fixing structure for a yoke housing and an end housing according to claim 8, wherein said notched portion has a bottom portion having a diameter smaller than an inner diameter of said pair of projecting portion in a radial direction of said yoke housing, a third clearance being formed between said bottom portion and the inner diameter of said pair of projecting portions in the radial direction of said yoke housing when said pair of projecting portions is inserted into said notched portion.

10. A fixing structure for a yoke housing and an end housing according to claim 9, wherein the width of said notched portion is formed wider than that of said pair of projecting portions, and a fourth clearance is formed circumferentially at said opening portion of said yoke housing when said pair of projecting portions is inserted into said notched portion.

11. A fixing structure for a yoke housing and an end housing according to claim 10, wherein each of said pair of projecting portions is disposed so that a projecting direction thereof is orthogonal to a notched direction of said respective notched portion.

12. A fixing structure for a yoke housing and an end housing, in which said end housing supporting one end of a rotor is inserted into an opening portion of said yoke housing, said yoke housing being substantially cylindrical and having a bottom in which said rotor and stator are accommodated and which supports another end of said rotor, said yoke housing and said end housing being coaxially fixed together by a caulking of said yoke housing, comprising:

at least three protrusions positioned at said end housing so as to be disposed at regular intervals along a peripheral direction of said yoke housing;

at least three grooves positioned at said yoke housing, corresponding in number and position to said protrusions and being notched at a peripheral portion of said opening portion such that a width of each of said grooves is formed wider than a width of each said protrusions, said at least three grooves respectively holding said at least three protrusions such that said at least three protrusions are movable in a direction orthogonal to an axis of said yoke housing, each of said grooves accommodating a respective one of said protrusions with a first clearance circumferentially formed in said yoke housing, and when said protrusions are each accommodated in a respective one of said grooves, caulking claws provided at both ends in a widthwise direction of each of said grooves, are all simultaneously inclined inwardly from outsides in a widthwise direction of each of said protrusions so as to be caulked, thereby allowing each of said protrusions to be fixed such that said yoke housing and said end housing are coaxially positioned with each other.

13. A fixing structure for a yoke housing and an end housing according to claim 12, wherein said end housing has a peripheral portion whose outer diameter is smaller than an inner diameter of said opening portion of said yoke housing, and a second clearance is formed between an inner diameter of said yoke housing and the outer diameter of said end housing when said end housing is inserted into said yoke housing.

14. A fixing structure for a yoke housing and an end housing according to claim 13, wherein each of said protrusions is disposed so that a protruding direction thereof is orthogonal to a notched direction of a respective one of said grooves.

15. A fixing structure for a yoke housing and an end housing, in which said end housing supporting one end of a rotor is loaded into an opening portion of said yoke housing, said yoke housing being substantially cylindrical and having a bottom in which said rotor and a stator are accommodated and which supports another end of said rotor, said yoke housing and said end housing being coaxially fixed together by a caulking of said yoke housing, comprising:
at least three protrusions provided at said end housing so as to be disposed at regular intervals along a peripheral direction of said yoke housing, each of said protrusions having a notched portion which is notched from an end portion in a radial direction of said end housing toward an axis;
at least three pairs of caulking claws corresponding in number and position to said protrusions, disposed along a peripheral direction of said yoke housing and projecting in an axial direction of said yoke housing from a peripheral portion of said opening portion, said at least three pairs of caulking claws respectively holding said at least three protrusions such that said at least three protrusions are movable in a direction orthogonal to an axis of said yoke housing, and after each of said pair of caulking claws is inserted into a respective one of said notched portions in said protrusions, said pair of caulking claws are all simultaneously inclined outwardly in their widthwise directions so as to be caulked, thereby allowing each of said protrusions to be fixed so that said end housing and said yoke housing are coaxially positioned with each other.

16. A fixing structure for a yoke housing and an end housing according to claim 15, wherein said notched portion has a bottom portion having a diameter smaller than an inner diameter of said pair of projecting portions in a radial direction of said yoke housing, a third clearance being formed between said bottom portion and the inner diameter of said pair of projecting portions in the radial direction of said yoke housing when said pair of projecting portions is inserted into said notched portion.

17. A fixing structure for a yoke housing and an end housing according to claim 16, wherein a width of each of said notched portions is formed wider than a width of said pair of caulking claws, and a third clearance is formed circumferentially at said opening portion of said yoke housing when said pair of caulking claws are inserted into respective ones of said notched portions.

18. A fixing structure for a yoke housing and an end housing according to claim 17, wherein each of said pairs of caulking claws is disposed so that a projecting direction thereof is orthogonal to a notched direction of a respective one of said notched portions.

19. A fixing method of a yoke housing and an end housing, in which said end housing supporting a rotor is positioned at an opening portion of said yoke housing said yoke housing being substantially cylindrical and having a bottom in which said rotor and a stator are accommodated, said yoke housing and said end housing being fixed together by a caulking of said yoke housing, said fixing method comprising the steps of:
a first step of providing at least three extending portions such that said extending portions are disposed at said end housing at regular intervals along the peripheral direction of said yoke housing;
a second step of providing at least three joining portions at said yoke housing, said joining portions corresponding in number and position to said extending portions;
a third step of setting each of said extending portions at a respective one of said joining portions such that each of said extending portions is movable in a direction orthogonal to an axial direction of said yoke housing; and
a fourth step of caulking all of said joining portions simultaneously after said third step, and fixing said end housing and said yoke housing such that said yoke housing and said end housing are coaxially positioned.

20. A fixing method of a yoke housing and an end housing according to claim 19, wherein said third step further comprises a step of supporting one end of said rotor by said yoke housing and another end of said rotor by said end housing.

21. A fixing method of a yoke housing and an end housing according to claim 19, wherein said fourth step comprises a step of caulking a pair of caulking claws disposed in respective ones of said joining portions, so that said extending portions are fixed.

22. A fixing method of a yoke housing and an end housing according to claim 21, wherein the caulking process in said fourth step is effected by inclining said pair of caulking claws in a peripheral direction of said yoke housing.

* * * * *